May 6, 1969
G. KESSLER
3,442,059
PLASTIC EDGE CHANNEL FOR GLASS WINDOWS
Filed Jan. 31, 1967
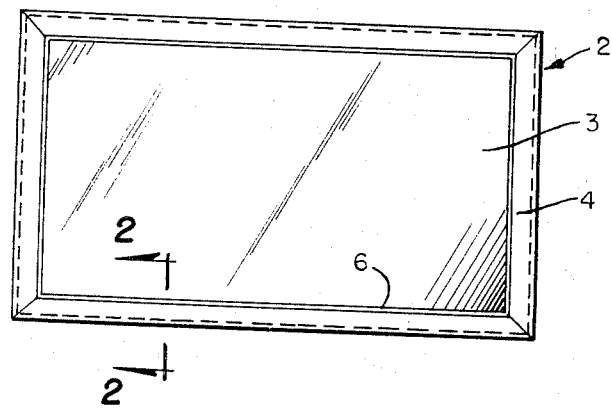
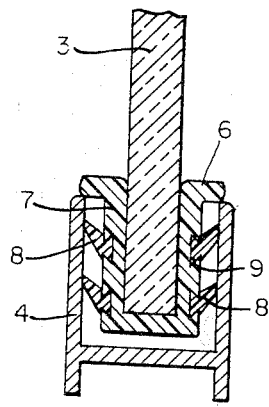
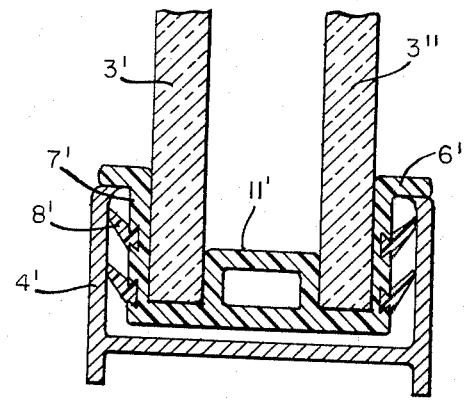
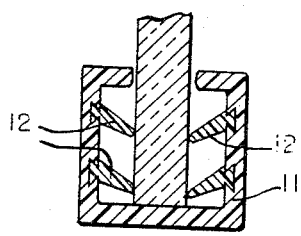
INVENTOR
Gerald Kessler
BY *Max L. Libman*
ATTORNEY

United States Patent Office 3,442,059
Patented May 6, 1969

3,442,059
PLASTIC EDGE CHANNEL FOR GLASS WINDOWS
Gerald Kessler, 388 Cranberry Road,
Youngstown, Ohio 44512
Filed Jan. 31, 1967, Ser. No. 612,901
Int. Cl. E04b 1/62; E04f 15/14, 15/22
U.S. Cl. 52—399          3 Claims

ABSTRACT OF THE DISCLOSURE

A glass window having metal or rigid plastic frames, the frames having a U-channel into which the glass is forced, there bing a semi-rigid plastic spacer in the form of an intermediate plastic channel member between the glass and the frame channel, said intermediate channel member serving to securely hold the glass in the frame member. Soft plastic inserts in the plastic channel member are provided which are interlocked firmly into the harder plastic in such fashion as to permit easy insertion but to resist withdrawal.

*Background of the invention*

In conventional present-day glazing, a flexible U-channel is placed over a piece of glass, and an aluminum framing member having a larger U-channel is then forced over the flexible channel in order to secure the aluminum frame member to the glass. This is done on all four edges of the glass pane, the aluminum framing member pieces being suitably secured at the corners in known fashion. The intermediate plastic channel member serves to provide a friction fit between the glass and the aluminum frame, and it will be apparent that the plastic member must be so made as to have a certain amount of lateral flexibility in order to provide such a friction fit, and this is usually done by providing longitudinal ribs on the external surface of the plastic channel member whereby it can frictionally engage the internal surface of the U-channel in the aluminum framing member with some resiliency in order to provide such a fit. Conventionally, the plastic channel member is an extruded member of flexible plastic material; it must have a certain degree of rigidity in order to have the necessary strength, but at the same time at least the ribs which engage the metal must have a certain amount of flexibility in order to perform their intended function of resilient frictional engagement.

These contradictory requirements are difficult to satisfactorily meet in a plastic channel member made all of the same material. The present invention solves the problem by providing a dual-extrusion plastic channel member in which the ribs are made of softer and more resilient material than the main body of plastic channel, and are firmly and positively locked to the plastic channel, not by relying upon heat alone, but by a positive mechanical locking engagement.

The specific nature of the invention, as well as other objects and advantages thereof, will clearly appear from a description of a preferred embodiment as shown in the accompanying drawing, in which:

FIG. 1 is a side view of a window according to the invention;

FIG. 2 is a sectional view taken on line 2—2 of FIG. 1;

FIG. 3 is a similar sectional view of a modified form of the invention; and

FIG. 4 is a similar sectional view of a different form of the invention.

*Description of the invention*

Referring to FIG. 1, the invention is typically embodied in a window 2 having a glass pane 3, and a metal frame or sash 4, commonly of aluminum. As shown in FIG. 2, the edge of the glass 3 is set into the U-shaped channel in the frame 4 by means of a plastic channel member 6 which is also U-shaped, and which has its main U-shaped portion 7 formed of relatively hard semi-rigid plastic which has only a limited amount of flexibility. As the channel 6 is initially formed, the upstanding legs of the U are biased slightly inwardly, so that when the glass is inserted as shown in FIG. 2, it is firmly held between the upstanding legs which press toward each other on opposite sides of the glass and thus engage it firmly. In order to provide the desired resilient friction engagement with the metal frame 4, channel 6 is also provided with a number of outwardly extending longitudinal or axial ribs 8, which are made of a much softer and more resilient material than the channel member 7, e.g., extruded sponge plastic having a very fine cell structure, although other suitably soft plastic materials may be employed. It will be noted that the base of each rib 8 is interlocked as shown at 9 to form an interlocking dovetail joint with the harder plastic material 7 and thus forms a strong mechanical bond. The two materials are extruded simultaneously by dual extrusion processes which are well known in the art. Essentially, the rigid compound is forced through the die with one extruder while the flexible compound is forced through the same die with another extruder, the die apertures being suitably shaped to provide the desired interlocking structure. In practice, with most materials which are employed for this purpose, the extrusion temperature is sufficient so that considerable heat fusion takes place between the two members, but since the soft ribs 8 may be subjected to considerable force during assembly, the heat bonding alone may not be sufficient in all cases, while the mechanical bonding, by providing a positive interlock, adds greatly to the strength and reliability of the bond. The four metal frame members are adjoined at the corners by methods well known in the art, which are not a part of the present invention and therefore will not be described in detail.

FIG. 3 shows a modification employed for double insulated glass, i.e., glass windows having two panes for insulation. In this case, the channel 7' is made with a central spacer 11' so that it provides two spaced sub-channels for two glass panes 3' and 3". The construction is otherwise similar to that shown in FIG. 2. In assembly, the two panes are first assembled with one of the plastic spacer channels on each edge, and the metal window frame 4' is then forced over the flexible ribs 8 completing the sash in the same manner as previously described. In the single-pane window of FIG. 2, the preferred method of assembly is to place the plastic channel in the aluminum frame channel first and then force this assembly over the glass.

FIG. 4 shows a form of the invention which in a sense is an inversion of the form shown in the other figures. In this form, the channel 11 is made of rigid hard plastic and is the outer frame of the glass panel; it holds the glass directly by means of soft plastic inserts 12, similar to those shown at 8 in FIG. 2. The dimensions and clearances are such that the glass can be pushed into the channel with some force and thereafter is not easily withdrawn.

I claim:

1. A window comprising
   (a) a glass pane,
   (b) a rigid sash member enclosing said pane, said sash having a U-shaped channel into which the edge of the glass pane is set,
   (c) a plurality of longitudinally extending ribs of soft, resilient plastic material lying between said glass pane and the legs of said U-shaped channel and frictionally retaining the glass pane in the channel, (d) said ribs being slanted in barb-like fashion to permit relatively easy insertion of the glass pane into the channel, but to resist withdrawing of the glass pane from the channel, (e) the base portion of each of said ribs being interlocked mechanically, by a dovetail joint, with the plastic of said U-shaped channel to form a strong mechanical bond between the two.

2. A window comprising (a) a glass pane, (b) a rigid sash member enclosing said pane, (c) said sash having a channel into which the edge of the glass pane is set, (d) and a plastic intermediate channel member between said sash channel and said edge, (e) said plastic member having (1) a U-shaped channel portion of semi-rigid slightly flexible plastic material and having two upstanding legs between which the edge of the glass pane snugly fits and (2) a plurality of longitudinally extending ribs of soft, resilient plastic material extending between said U-shaped portion and the interior of said sash channel for frictionally engaging and retaining said U-shaped plastic channel and said glass pane within said sash channel, (f) the base portion of each of said ribs being interlocked mechanically, by a dovetail joint, with the plastic of said U-shaped channel to form a strong mechanical bond between the two.

3. The invention according to claim 2, said plastic intermediate channel member having a bottom element connecting said upstanding legs, and two spaced sub-channels in the bottom element respectively snugly receiving said glass pane and a second glass pane spaced from and parallel to the first glass pane.

References Cited

UNITED STATES PATENTS

| | | | |
|---|---|---|---|
| 2,667,951 | 2/1954 | Gall | 52—399 |
| 3,363,390 | 1/1968 | Crane et al. | 52—403 X |

FRANK L. ABBOTT, *Primary Examiner.*

P. C. FAW, JR., *Assistant Examiner.*

U.S. Cl. X.R.

52—403, 475, 616, 717